(12) United States Patent
Minagawa et al.

(10) Patent No.: US 6,335,606 B1
(45) Date of Patent: Jan. 1, 2002

(54) CONTROL DEVICE AND METHOD FOR MOTOR/GENERATOR

(75) Inventors: Yuusuke Minagawa, Yokosuka; Masaki Nakano, Yokohama, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/668,386

(22) Filed: Sep. 25, 2000

(30) Foreign Application Priority Data

Sep. 27, 1999 (JP) .......................... 11-273367
Sep. 8, 2000 (JP) .......................... 12-273212

(51) Int. Cl.⁷ .......................... H02P 5/34; H02K 16/00
(52) U.S. Cl. .................. 318/801; 318/802; 310/144
(58) Field of Search .................. 318/801, 802, 318/730, 811, 148, 153; 310/112, 113, 114, 266

(56) References Cited

U.S. PATENT DOCUMENTS

| | | | | |
|---|---|---|---|---|
| 5,744,895 A | * | 4/1998 | Seguchi et al. | 310/266 |
| 6,049,152 A | | 4/2000 | Nakano | 310/114 |
| 6,201,331 B1 | * | 3/2001 | Nakano | 310/114 |

FOREIGN PATENT DOCUMENTS

JP          8-340663         12/1996

* cited by examiner

Primary Examiner—Khanh Dang
(74) Attorney, Agent, or Firm—Foley & Lardner (57) ABSTRACT

A motor/generator has a stator provided with a plurality of coils (6), a first rotor (3) provided with a fixed number of magnetic poles, and a second rotor (4) provided with fewer magnetic poles than the first rotor (3). A current of the composite wave form is supplied from an inverter (12) to the coils (6) in response to a signal generated by a control unit (15). The control unit (15) is programmed to calculate a wave form of a first current flowing through the coils (6) which generates a rotating magnetic field which is synchronous with a magnetic field produced by the first rotor (3), and calculate a wave form of a second current flowing through the coils (6) which generates a rotating magnetic field which is synchronous with a magnetic field produced by the second rotor (4). The microprocessor (15) is further programmed to calculate a wave form of a correcting current which, at a position where a specific magnetic pole in the first rotor (3) and a pole of the second rotor (4) with the same polarity face each other, increases the density of the magnetic flux passing through the specific magnetic pole and generate the signal which realizes a composite wave form comprising wave forms of the first, second and correcting currents.

14 Claims, 12 Drawing Sheets

FIG. 7A  INNER ROTOR

FIG. 7B

FIG. 7C  OUTER ROTOR

CONTROL DEVICE AND METHOD FOR MOTOR/GENERATOR

FIELD OF THE INVENTION

This invention relates to control of a motor/generator provided with a plurality of independently rotating rotors and one stator.

BACKGROUND OF THE INVENTION

Tokkai-Hei-8-340663 published by the Japanese Patent Office in 1996 discloses an electric motor provided with a plurality of independently rotating rotors and a single stator.

This motor comprises two groups of coils on the stator designated for each rotor so that two rotors rotate separately.

Two inverters are provided in order to control the electrical current applied to each group of the designated coils.

SUMMARY OF THE INVENTION

Since the above electrical motor uses two groups of coils and two inverters, large current loss inevitably results.

In this context, U.S. Pat. No. 6,049,152 discloses a motor/generator in which two rotors having magnets with different numbers of poles are rotated independently by applying a composite current to a single group of stator coils from a single energizing circuit.

However a demagnetization effect occurs when the poles of the magnets facing each other are identical. As a result, when the motor/generator is continuously used at high temperatures, the possibility arises of deterioration in magnetic properties due the demagnetization effect.

It is therefore an object of this invention to protect the magnet from suffering magnetic deterioration by controlling the energizing current of the stator coils.

In order to achieve the above object, this invention provides a current control device for such a motor/generator that has a stator provided with a plurality of coils, a first rotor provided with a fixed number of magnetic poles facing the stator, and a second rotor provided with fewer magnetic poles than the first rotor. The magnetic poles of the second rotor also face the stator.

The control device comprises an inverter which regulates a wave form of an AC power current flowing through the coils in response to a signal, and a microprocessor. The microprocessor is programmed to calculate a wave form of a first current flowing through the coils which generates a rotating magnetic field which is synchronous with a magnetic field produced by the first rotor, calculate a wave form of a second current flowing through the coils which generates a rotating magnetic field which is synchronous with a magnetic field produced by the second rotor, calculate a wave form of a correcting current which, at a position where a specific magnetic pole in the first rotor and a pole of the second rotor with the same polarity face each other, increases a density of a magnetic flux passing through the specific magnetic pole, and generate the signal which realizes a composite wave form comprising a wave form of the first current, a wave form of the second current and a wave form of the correcting current.

This invention also provides a control method for such a motor/generator that has a stator provided with a plurality of coils, a first rotor provided with a fixed number of magnetic poles facing the stator, and a second rotor provided with fewer magnetic poles than the first rotor. The magnetic poles of the second rotor also face the stator.

The control method comprises calculating a wave form of a first current flowing through the coils which generates a rotating magnetic field which is synchronous with a magnetic field produced by the first rotor, calculating a wave form of a second current flowing through the coils which generates a rotating magnetic field which is synchronous with a magnetic field produced by the second rotor, calculating a wave form of a correcting current which, at a position where a specific magnetic pole in the first rotor and a pole of the second rotor with the same polarity face each other, increases a density of a magnetic flux passing through the specific magnetic pole; and providing the coils with a power current of a composite wave form comprising a wave form of the first current, a wave form of the second current and a wave form of the correcting current.

The details as well as other features and advantages of this invention are set forth in the remainder of the specification and are shown in the accompanying drawings.

DESCRIPTION OF THE PREFERRED EMBODIMENTS

Figure 1:
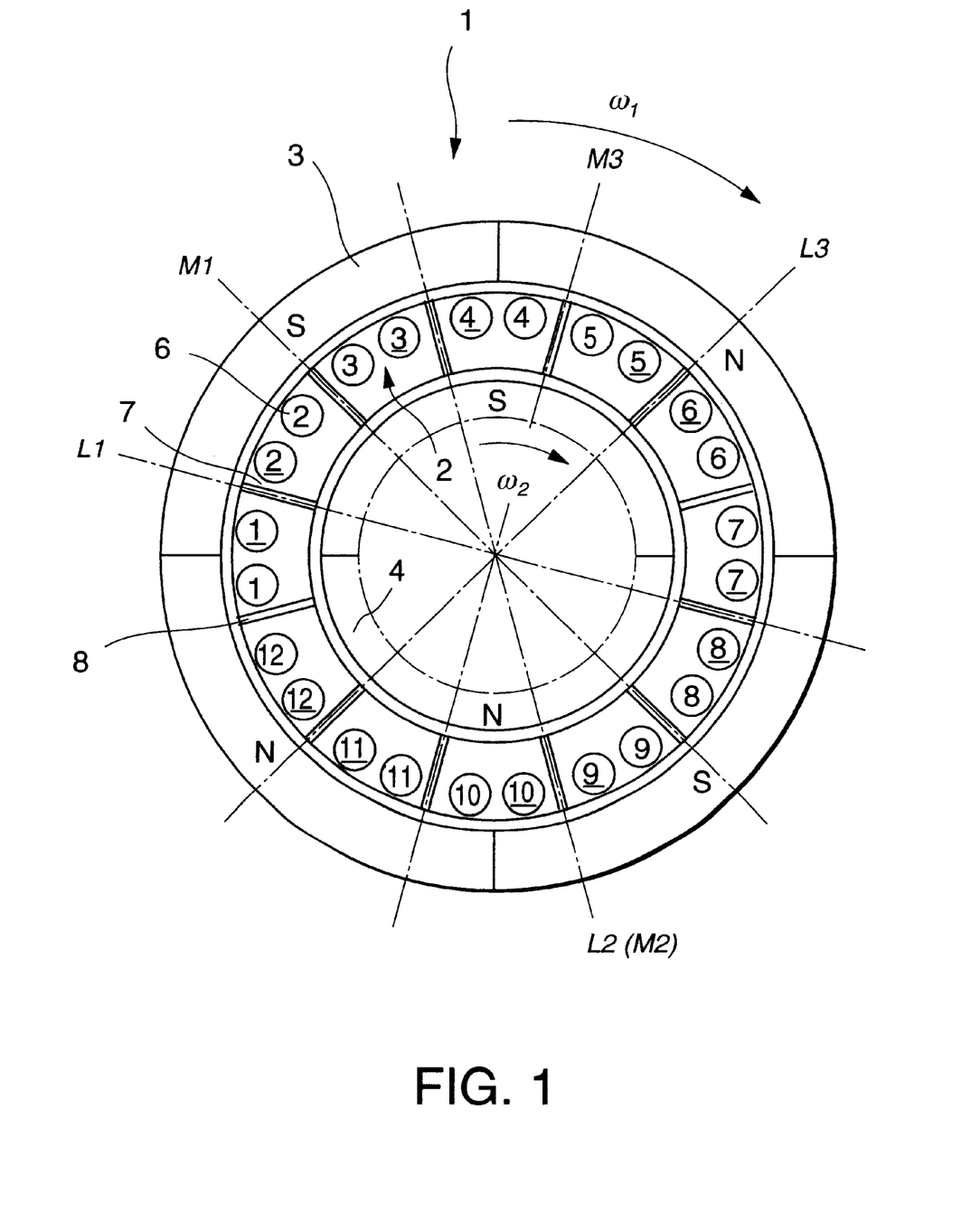
FIG. 1 is a schematic cross-sectional view of a motor/generator to which this invention is applied.

Referring to FIG. 1 of the drawings, a motor/generator to which this invention is applied, is provided with an outer rotor 3 as a first rotor and an inner rotor 4 as a second rotor. The rotors 3, 4 are disposed co-axially at fixed intervals on the inside and outside of a cylindrical stator 2. Magnets are provided on the inner rotor 4 with N poles and S poles oriented with respect to the stator 2 at 180 degree intervals.

The outer rotor 3 is provided with a magnet having a pole ratio of 2:1 with respect to the inner rotor 4. That is to say, there are twice as many poles on the outer rotor 3. Therefore the N poles and S poles of the magnet of the outer rotor 3 are oriented with respect to the stator 2 at 90 degree intervals.

This disposition of magnetic poles on the rotors 3 and 4 avoids the magnet of the inner rotor 4 applying a rotational force to the magnet of the outer rotor 3 and avoids the magnet of the outer rotor 3 applying a rotational force to the magnet of the inner rotor 4.

This point will be described in further detail below.

Firstly, the effect that the magnet of the inner rotor 4 exerts on the magnet of the outer rotor 3 is considered. In order to simplify the discussion, it is assumed that the inner rotor 4 is fixed. As shown in FIG. 1, the S pole of the magnet which is disposed on the upper section of the inner rotor 4 in the figure applies an attractive force to the N pole of the magnet on the upper section of the outer rotor 3 and a rotational force in an anti-clockwise direction is applied to the outer rotor 3 in the figure. On the other hand, the N pole of the magnet disposed on the lower section of the inner rotor 4 in the figure applies an attractive force to the N pole of the magnet on the lower section of the outer rotor 3 and a rotational force in a clockwise direction is applied to the outer rotor 3 in the figure. This results in the rotational forces applied by the inner rotor 4 on the outer rotor 3 canceling out.

Therefore the rotation of the outer rotor 3 is solely based on its relationship with the stator 2 and bears no relationship to the rotation position of the inner rotor 4. Likewise the rotation of the inner rotor 4 is solely based on its relationship with the stator 2 and bears no relationship to the rotation position of the outer rotor 3.

The stator 2 is provided with three stator coils 6 for each magnetic pole of the outer rotor 3. Therefore there are a total of twelve coils 6 wound onto the cores 7 of the stator 2. An end of the core 7 positioned on an outer periphery of the stator 2 is facing the outer rotor 3 and the other end of the core 7 positioned on an inner periphery of the stator 2 of the core 7 is facing the inner rotor 4. The cores 7 are disposed at equal intervals on the same circle. A gap 8 is provided between adjacent cores 7 to increase the magnetic resistance therebetween.

A non-magnetic member may be gripped between adjacent cores 7 instead of forming the gap 8.

For the sake of convenience, the numbers shown in FIG. 1 are assigned to these twelve coils 6. To distinguish them from part numbers, the symbol # is attached before a number as in the coil #6 to indicate a coil number. Currents $I_1$–$I_{12}$ are passed into these twelve coils #1–#12.

First, a three phase alternating current is passed into three sets of coils to generate a rotational magnetic field relative to the inner rotor 4. Specifically, a current is passed through the coils #1, #2, #7 and #8 so as to form a virtual coil around a virtual axis which intersects perpendicularly with the rotating axis of the rotor 3 (4). For this purpose, a current Id is passed through the coils #1 and #2 in the reverse direction to the coils #7 and #8 which are situated on the opposite side of the rotation axis of the rotor 3 (4) as center. This is done by directing half a current Id through the coil #7 from the coil #1 and directing the other half of the current Id to the coil #8 from the coil #2. As the coils #1 and #2 are adjacent to each other and the coils #7 and #8 are also adjacent to each other, due to this current supply, the same situation occurs as when the current Id flows through the virtual coil mentioned above, and consequently, an N and a S pole are formed at the two ends of a virtual axis.

Similarly, the coils #3, #4, #9, #10 form one set, and a current Ie flows through these coils as if they formed one virtual coil around another virtual axis rotated by 120 degrees from the aforesaid virtual axis.

Further, the remaining coils #5, #6, #11, #12 form one virtual coil around another virtual axis rotated by 120 degrees, and a current If flows through these coils.

Hence, three virtual coils are formed with winding axes which differ by 120 degrees, and an N pole and S pole region are formed every 180 degrees as in the case of the inner rotor 3. A three-phase alternating current is supplied to these sets of coils, and the resultant virtual coil progressively varies its polarity according to the phase of the current. As a result, two pole rotating magnetic fields are formed enclosing the inner rotor.

In this embodiment, the flow of the current is represented in the form [#1,#2]=[#7, #8], [#3, #4]=[#9,#10], [#5,#6]= [#11, #12].

A coil with an underlined number means that a current is passed in the reverse direction of a coil with a number which is not underlined.

Next, a three-phase current is passed into three sets of coils by the following combination so as to generate a magnetic field relative to the outer rotor 3.

[1]=[4]=[7]=[10], [2]=[5]=[8]=[11], [3]=[6]=[9]=[12]

In other words, a current Ia is passed to coil #4 from coil #1, and a current Ia is made to flow to coil #10 from coil #7. Considering a line connecting an intermediate point between coil #1 and #4 and an intermediate point between coil #7 and #10 in FIG. 1 as a virtual axis, a virtual coil is formed comprising coil #1 and #4 and a virtual coil is formed comprising coil #7 and #10 around the axis due to the current Ia.

As the flow of current of these virtual coils is in opposite directions, an N pole is formed for example at the two ends of the virtual axis and an S pole is formed near the rotation axis of the rotor 3 (4) in the two sets of virtual coils. Considering this on the periphery relative to the outer rotor 3, it is equivalent to forming N poles and S poles alternately at 90 degrees intervals.

Similarly, for coils #2, #5, #8 and #10, a current Ib is passed. Similarly, for coils #3, #6, #11 and #12, a current Ic is passed. Due to this, four -pole rotating magnetic fields are formed relative to the outer rotor 3.

To satisfy the above conditions, the following currents $I_1$–$I_{12}$ should be passed through the twelve coils 6.

$I_1 = ½·Id+Ia$ $I_2 = ½·Id+\underline{Ic}$ $I_3 = ½·\underline{If}+Ib$ $I_4 = ½·\underline{If}+\underline{Ia}$ $I_5 = ½·Ie+Ic$ $I_6 = ½·Ie+\underline{Ib}$ $I_7 = ½·\underline{Id}+Ia$ $I_8 = ½·\underline{Id}+\underline{Ic}$ $I_9 = ½·If+Ib$ $I_{10} = ½·If+\underline{Ib}$ $I_{11} = ½·\underline{Ie}+\underline{Ic}$ $I_{12} = ½·\underline{Ie}+Ib$ A current in the reverse direction is shown by underlining added to the current symbol.

Figure 2:
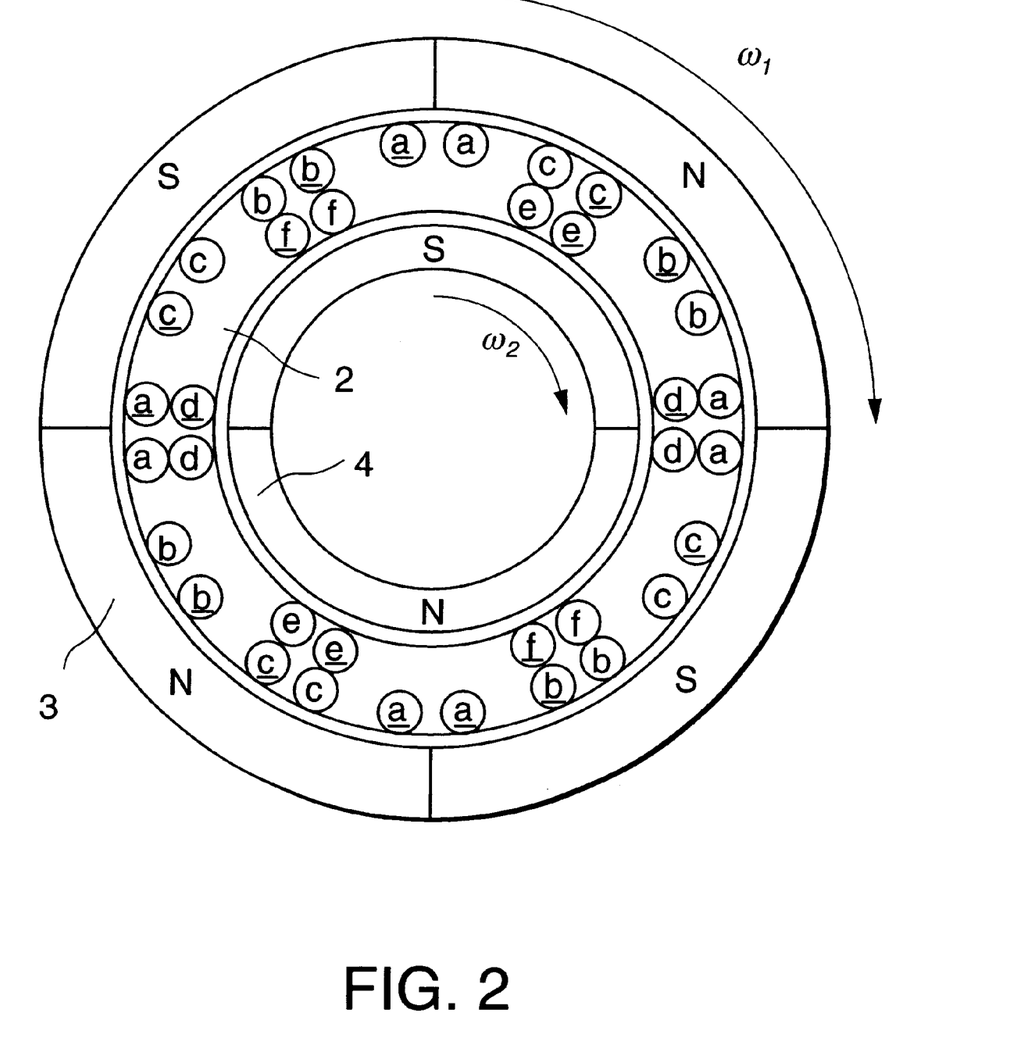
FIG. 2 is a schematic cross-sectional view of the motor/generator describing a composite current supplied to the motor/generator by a control device according to this invention.

Nest, referring to FIG. 2, the determination of the currents will be described. FIG. 2 is provided for the purpose of comparison with the motor/generator in FIG. 1. In the motor/generator in FIG. 2, specific coils d, f, e are provided for rotating the inner rotor 4 and specific coils a, c, b are provided for rotating the outer rotor 3.

In other words inner coil d, f, e form rotating magnetic fields relative to the inner rotor 4 and outer coil a, c, b form rotating magnetic fields relative to the outer rotor 3.

To combine these two groups of coils into the one group shown in FIG. 1, of the inner coils in FIG. 2, half of the current passed into the coil d is taken up by each of the coils a and c which are in the vicinity of the coil d, half of the current passed into the coil f is taken up by each of the coils a and c which are in the vicinity of the coil f, and half of the current passed into the coil e is taken up by each of the coils c and b which are in the vicinity of the coil e. The equations for the currents $I_1$–$I_{12}$ mentioned above are mathematical expressions of this concept. However, the currents may be set by other methods described hereafter.

When this current setting is applied, two rotating magnetic fields can be formed simultaneously, i.e., rotating magnetic fields relative to the inner rotor 4 and rotating magnetic fields relative to the outer rotor 3, despite the use of one set of coils. Also, the rotating magnetic fields which the stator 2 forms relative to the outer rotor 3 do not give a rotational torque to the permanent magnets of the inner rotor 4, and the rotating magnetic fields which the stator 2 forms relative to the inner rotor 4 do not give a rotational torque to the permanent magnets of the outer rotor 3.

The frequency of the currents Id, If, Ie is set based on a target rotation speed of the inner rotor 4 and that of the currents Ia, IC, Ib is set based on a target rotation speed of the outer rotor 3.

In this way, in this motor/generator, two rotors 3 and 4 and one stator 2 are arranged coaxially in three layers, a series of coils 6 is provided in the stator 2, and currents are passed to these coils 6 so as to generate rotating magnetic fields inside and outside which are equal in number to the number of magnetic poles of the rotors 3 and 4.

Therefore, when one of the rotors 3 and 4 is driven as a motor and the other is driven as a generator, a current differential between the motor drive force and the generator drive force may passed into the coils 6. It is not necessary to provide specific coils for the rotors 3 and 4 separately as in the aforesaid prior art. Hence, current losses are largely reduced.

Further, as the rotation of two rotors 3 and 4 can be controlled by a single inverter 12, the cost of the inverter can be reduced, and as the power switching transistor capacitance of the inverter is reduced, switching efficiency improves.

The structure of the motor/generator above is the same as that disclosed in U.S. Pat. No. 6,049,152. The type of motor/generator disclosed in U.S. Pat. No. 6,049,152 is not limited to a pole ratio between the two rotors of 2:1 and other ratios such as 3:1 may also be employed.

Figure 3:
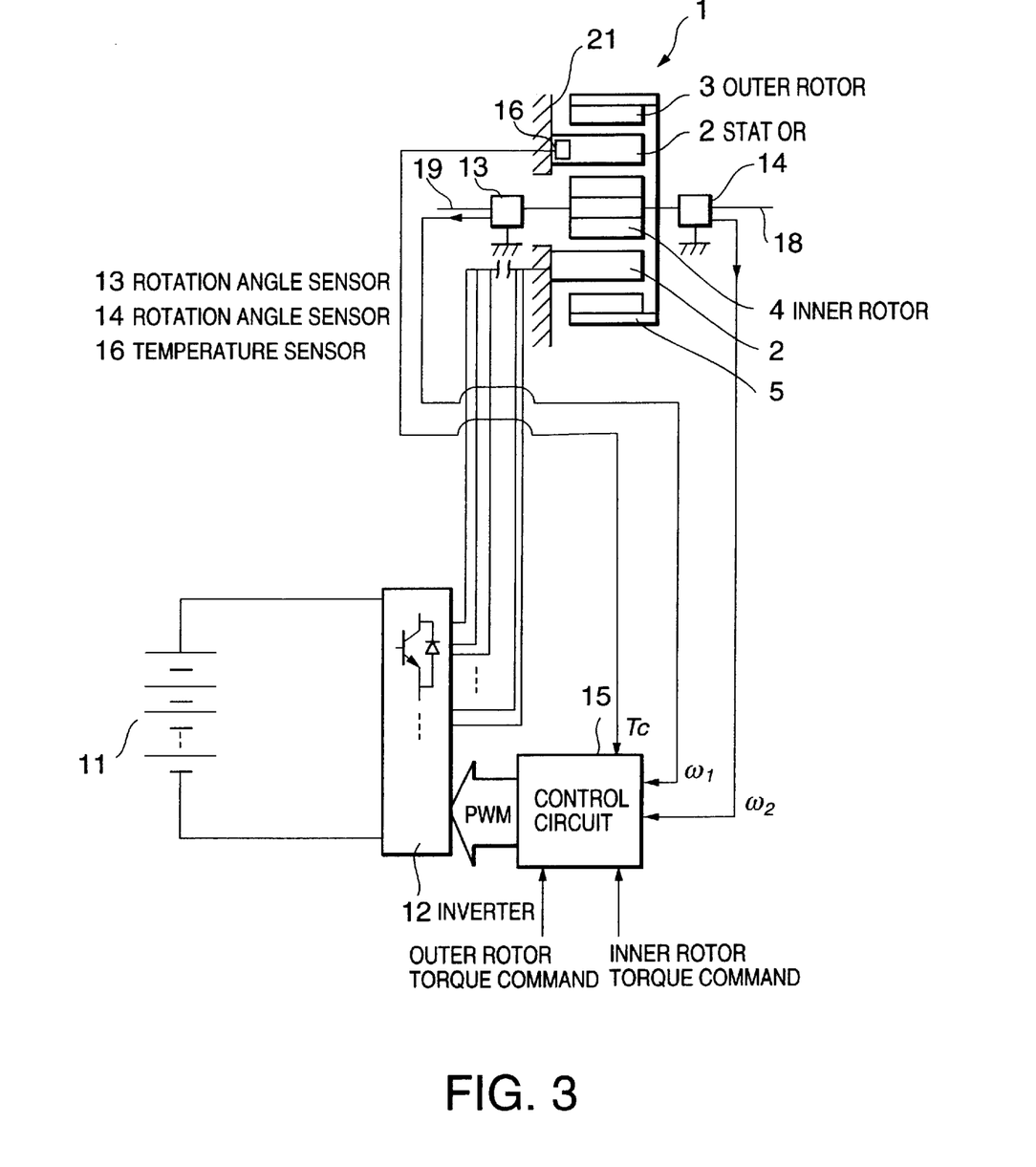
FIG. 3 is a block diagram of the control device.

Now referring to FIG. 3, the control device which performs control of the current provided to the motor/generator 1 will be described.

Figure 4:
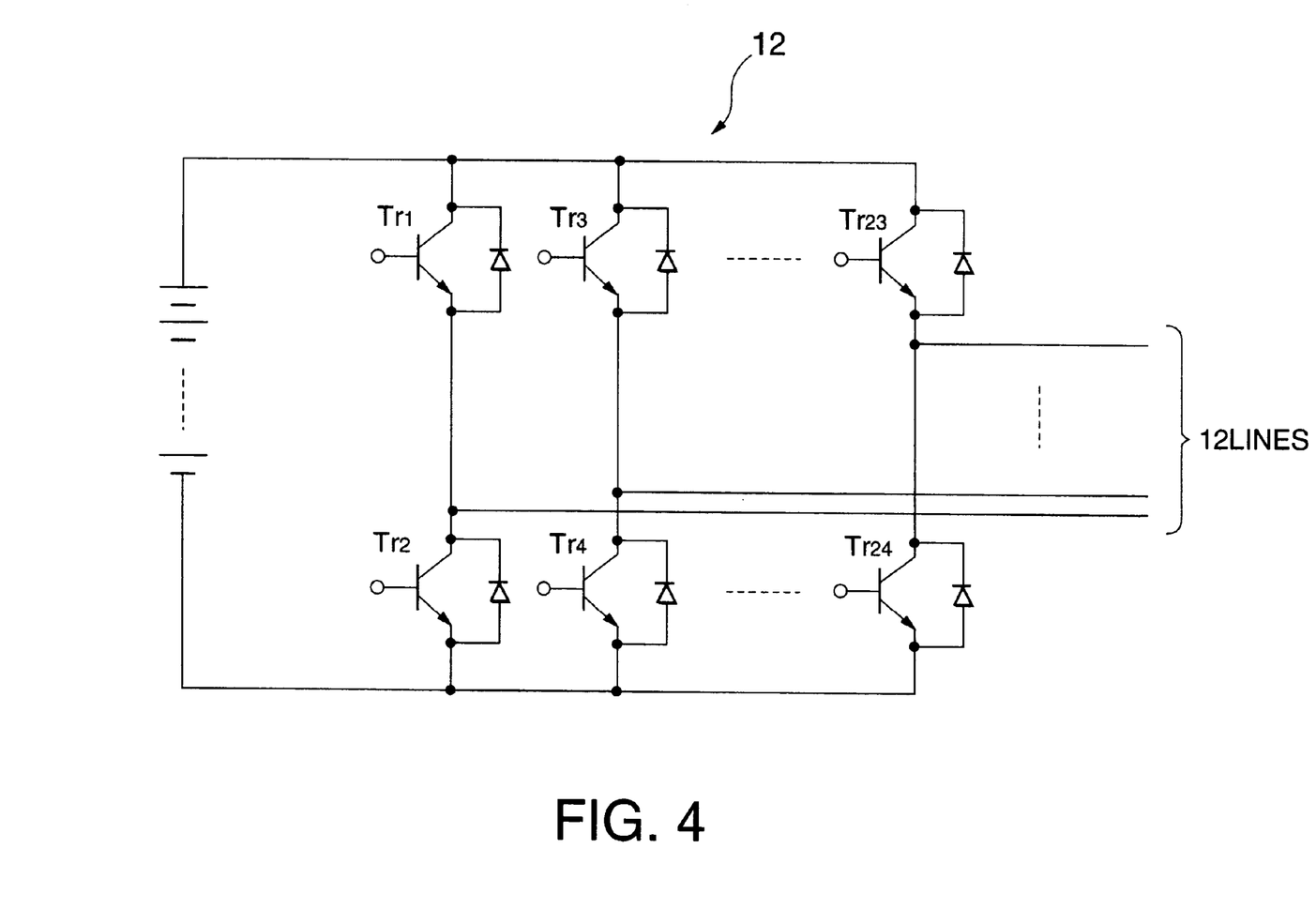
FIG. 4 a circuit diagram of a power source and inverter according to this invention.

The control device is provided with an inverter 12 which converts a DC current from the battery power source 11 into an AC current in order to supply the composite currents $I_1$–$I_{12}$ to the stator 2. The inverter 12 is a normal 3-phase bridge-type inverter modified to 12 phases and is provided with 24 transistors $Tr_1$–$Tr_{24}$ and a corresponding number of diodes.

An ON/OFF signal transmitted to each gate of the inverter 12, that is to say, to the base of the transistors is a pulse width modulation (PWM) signal.

The control device is provided with rotation angle sensors 13 and 14 to detect the phases of the rotors 3 and 4. The signals from these sensors 13 and 14 are input into a control unit 15. A temperature sensor 16 is mounted on the stator 2 so as to detect the temperature of the magnets of the rotors 3 and 4. The signals from the temperature sensor 16 are also input into the control unit 15.

The control unit 15 comprises a microcomputer provided with a central processing unit (CPU), a read only memory (ROM), a random access memory (RAM) and an input/output interface (I/O interface). The control unit 15 inputs a PWM signal into the inverter 12 based on positive or negative torque command values input into the control unit 15 specifying the desired torques to be applied to the outer rotor 3 and the inner rotor 4. The inverter 12 applies AC currents to the coils #1–#12 based on the PWM signals.

When a composite current is flowing in one of the coils 6 in the state where the magnetic poles of the outer rotor 3 and inner rotor 4 facing the coil 6 are the same S poles or N poles, a demagnetization effect occurs between the magnets.

When the motor/generator is operated continuously at high temperatures, the demagnetization effect results in the deterioration of magnetic properties of the magnet.

Figure 5:
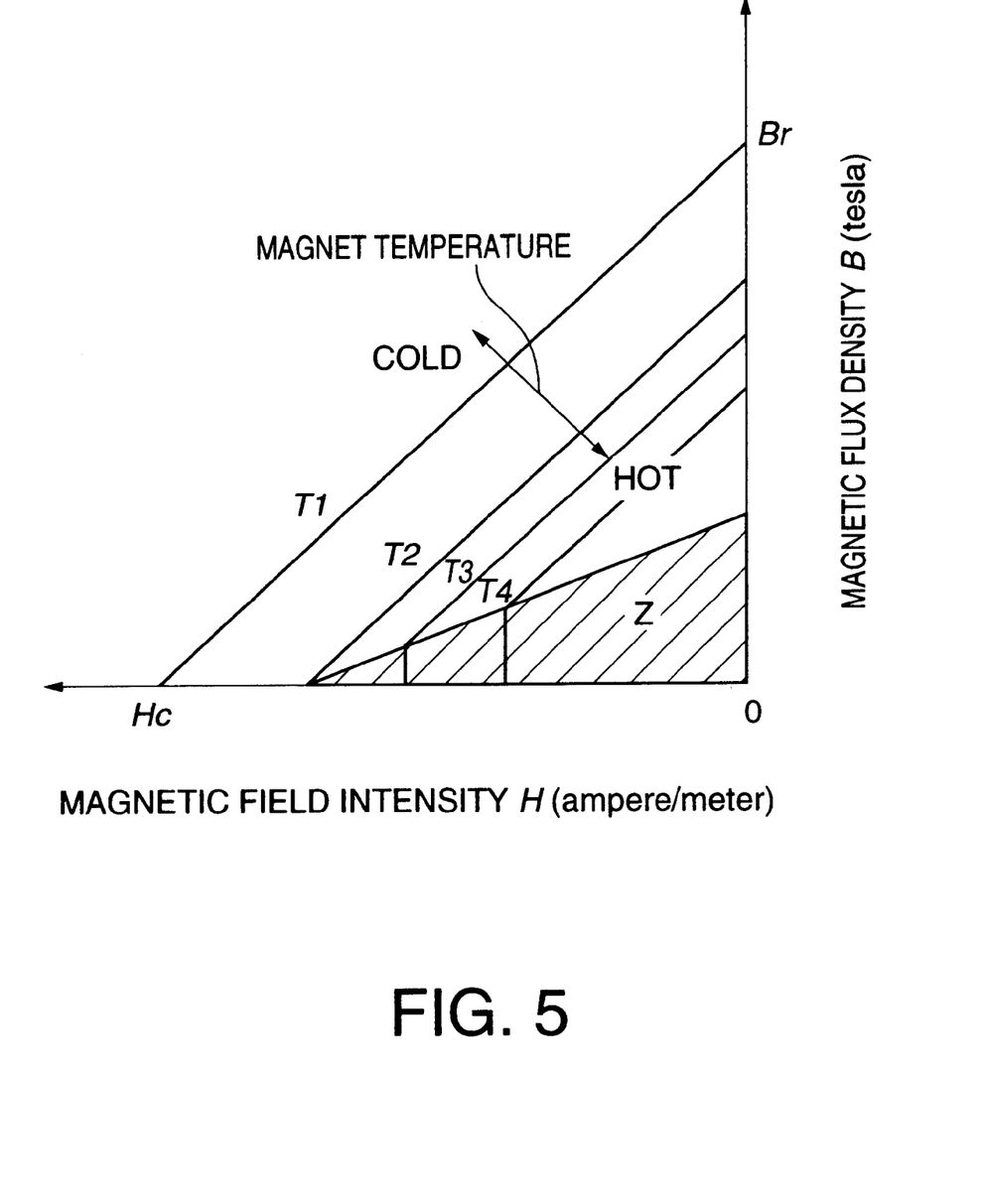
FIG. 5 is a diagram describing a deterioration region Z of a magnet.

As shown in FIG. 5, the deterioration region Z of the magnet is limited by the temperature Tc of the magnet, the magnetic flux density B and the magnetic field intensity H.

It should be noted that the magnetic field intensity H in the figure has a negative value.

The demagnetization effect will now be described referring to FIGS. 6A–6C.

Figure 6A:
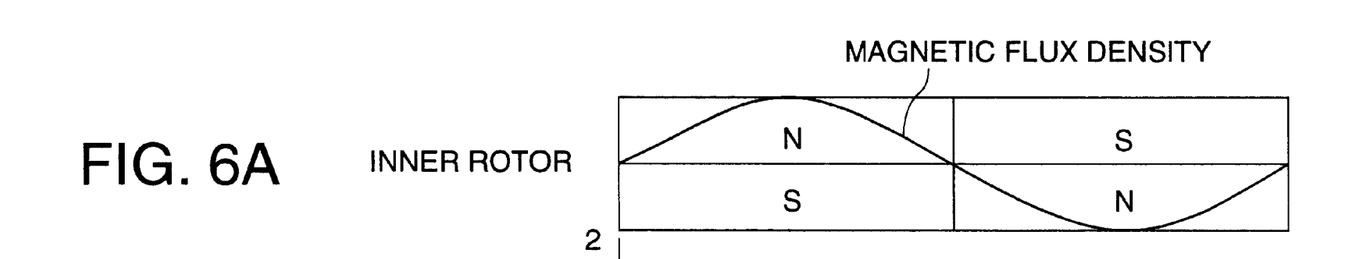
FIGS. 6A–6C are diagrams describing the distribution of a magnetic flux of the motor/generator when no correction is applied to the composite current.
Figure 6B:
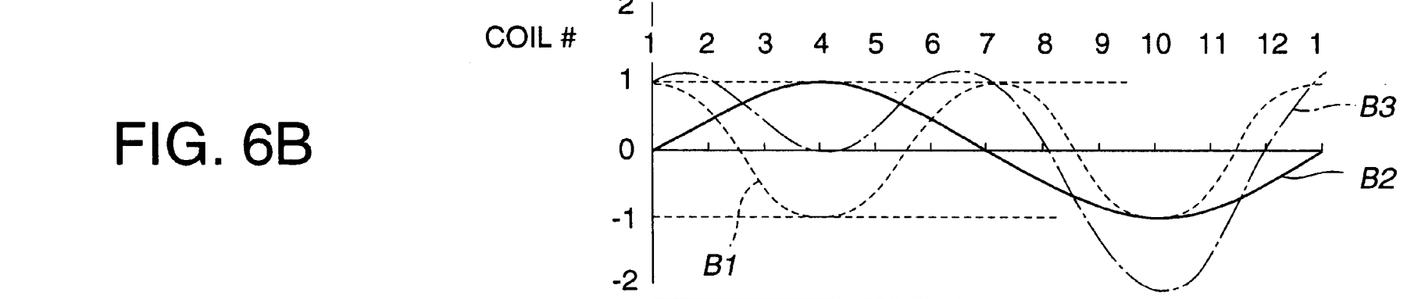

FIG. 6B shows the magnet flux density B1–B3 produced by the coils #1#–12 when a composite current comprising a first current and a second current is applied to each of the coils #1–#12. In the figure, the coils #1–#12 which are disposed on a circular periphery are extended on a straight line for the explanation purpose. The numbers on the horizontal axis of FIG. 6B represent the coil numbers and each number shows the central position of each coil. The vertical axis of FIG. 6B shows the magnetic flux density. FIG. 6A shows the magnetic flux density of the inner rotor 3 and FIG. 6C shows the magnetic flux density of the outer rotor 4. The magnetic flux density produced by the coils #1–#12 corresponds to the current applied to the coils #1–#12.

The magnetic flux density B1 for driving the outer rotor 3 is generated by a first current and the magnetic flux density B2 for driving the inner rotor 4 is generated by a second current. The magnetic flux density B3 represents the combination of the magnetic flux densities B1 and B2.

In order to simplify the description, the figures show instantaneous values when the rotors 3 and 4 are in the stationary state, and the magnetic fluxes generated by the coils 6 for driving the rotors 3, 4 respectively have the same phase as the magnetic fluxes of the magnets of the rotors 3, 4.

Since the magnetic flux density of the magnet can not be known without knowing the magnetic resistance at the point where the magnetic flux passes, the magnetic fluxes of FIGS. 6A and 6B have been drawn by assuming that the magnetic resistance is constant and the distribution of the magnetic flux in the magnets is represented by the normal distribution.

In FIG. 6B, the amplitude of the magnetic flux density B1 which drives the outer rotor 3 and of the magnetic flux density B2 which drives the inner rotor 4 are set to be equal. This means that the amplitude of the first current and the amplitude of the second current which generate the magnetic flux are also equal. Setting the amplitudes in such a manner increases the energy efficiency of the motor/generator.

Figure 6C:
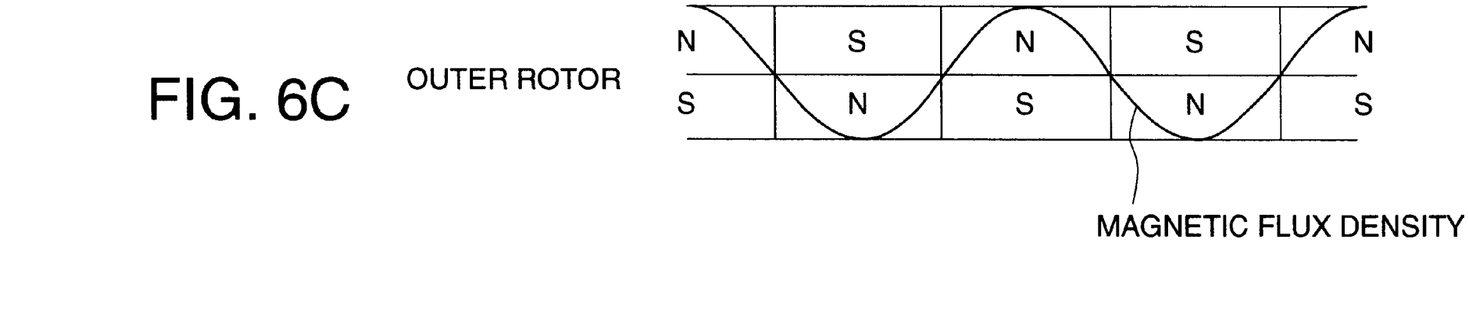

In FIGS. 6A–6C, the S pole of the inner rotor 4 faces the N pole of the outer rotor 3 in a state in which the coils #1,

2, #6, #7 are interposed therebetween. A magnetic flux flows to the S pole of the inner rotor 4 from the N pole of the outer rotor 3 through these coils.

The coils #3, #4, #5 are adjacent to the S pole of the outer rotor 3 and that of the inner rotor 4. Flow of magnetic flux is not generated between the magnets of the outer rotor 3 and the inner rotor 4 in this section. The S pole of the outer rotor 3 has a narrower width or angle range than the S pole of the inner rotor 4.

Due to this fact, as shown in FIGS. 6A–6C the S pole of the outer rotor 3 is far removed from the N pole of the inner rotor 4, so there is no inward flow of magnetic flux at all from the N pole of the inner rotor 4 to the S pole of the outer rotor 3 in the left half of FIG. 6C.

The magnetic flux density B1 driving the outer rotor 3 in this state has a value less than zero at the point of the coil #4.

On the other hand, the magnetic flux density B2 driving the inner rotor 4 is a positive value equal to the absolute value of the magnetic flux density B1.

As a result, the composite flux B3 of the magnetic flux density B1 and the magnetic flux density B2 take a value of zero at the point of the coil #4.

As there is no inflow of magnetic flux from either the inner rotor 4 or the stator 2 into the S pole of the outer rotor 3, it suffers the demagnetization effect.

If demagnetization effect occurs at high temperatures, it means that the operation conditions of the motor/generator correspond to the deterioration region Z in FIG. 5 and the magnetic properties of the magnet of the outer rotor 3 may therefore be deteriorated.

This invention avoids deterioration of the magnetic properties of the magnet by controlling the current flowing in the coils #1–#12 of the stator 2. That is to say, the current is controlled to reduce the peak of the magnetic flux density B2 which is reached at the point of the coil #4. The control unit 15 modifies the current wave form for this purpose and PWM signals are output to the inverter 12 so that the currents having the modified wave form are supplied to the coils 6.

The magnetic flux density B1 at an angle θ of the outer rotor 3 is represented by Equation (1) below. The magnetic flux density B2 at an angle θ of the inner rotor 4 is represented by Equation (2) below.

$$B1 = Bm2 \cdot \sin(2 \cdot \omega_1 \cdot t - 2 \cdot \theta) \quad (1)$$

$$B2 = Bm1 \cdot \sin(\omega_2 \cdot t + \alpha - \theta) \quad (2)$$

where, Bm2=1/2 of the amplitude of the magnetic flux density B1,

Bm1=1/2 of the amplitude of the magnetic flux density B2 (=Bm2), $\omega_1$=angular velocity of the outer rotor 3, $\omega_2$=angular velocity of the inner rotor 4, t=elapsed time after coincidence of the phases of the stator coil 6 and the magnet of the outer rotor 3, and α=the phase difference of the magnet of the inner rotor 4 and the magnet of the outer rotor 3 at t=0.

α and θ have a value of zero in the state shown in FIGS. 6A–6C. Therefore Equation (2) may be rewritten in the manner below.

$$B2 = Bm1 \cdot \sin(\omega_2 \cdot t) \quad (3)$$

A corrected magnetic flux density B2A is calculated by adding the third harmonic component B23 expressed by Equation (4) to Equation (3).

$$B23 = Bm1 \cdot \sin(3 \cdot \omega_2 \cdot t) \quad (4)$$

$$B2A = B2 + K1 \cdot B23 \quad (5)$$

where, K1=coefficient.

Figure 7A:
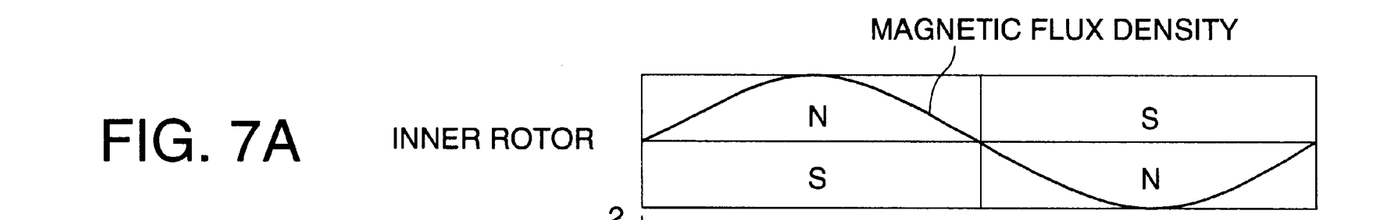
FIGS. 7A–7C are diagrams describing the distribution of the magnetic flux of the motor/generator when a correction of the composite current is performed by the control device.
Figure 7B:
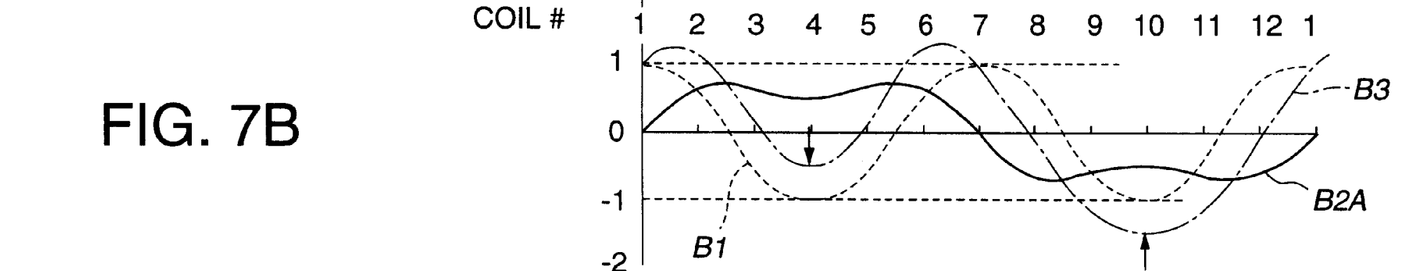
Figure 7C:
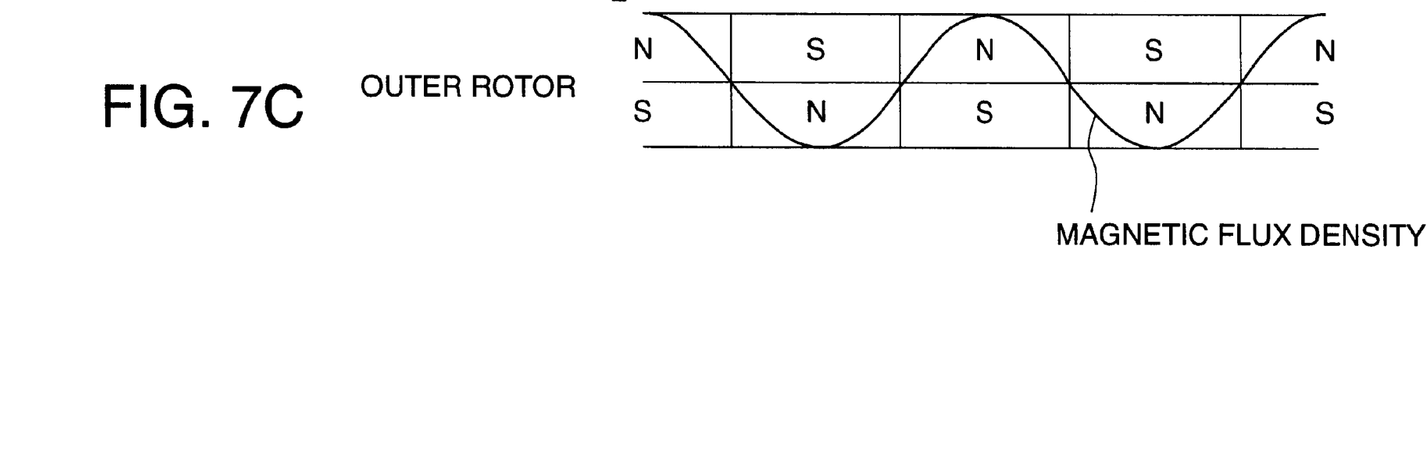

FIGS. 7A–7C show the variation in magnetic flux density when the corrected magnetic flux density B2A calculated by Equation (4) is applied instead of the magnetic flux density B2.

The wave form of the magnetic flux density B2A is shown in FIG. 7B. As shown in the figure, when a corrected magnetic flux density B2A is applied instead of the magnetic flux density B2, the composite magnetic flux density B3 shifts into the negative region at the coil #4.

The peak value of the correcting magnetic flux density B2A at coil #4 is smaller than the peak value of the magnetic flux density B2 shown in FIG. 6B. As a result, a flow of magnetic flux towards the outer rotor 3 from the inner rotor 4 is formed in the core of coil #4.

As a result, the magnetic flux flowing into the S pole of the magnet of the outer rotor 3 is increased.

Even when the corrected magnetic flux density B2A is applied instead of the magnetic flux density B2, the root mean square value (RMS) of the composite current which realizes the composite magnetic flux density B3 does not change from the RMS when magnetic flux density B2 is applied.

Figure 8A:
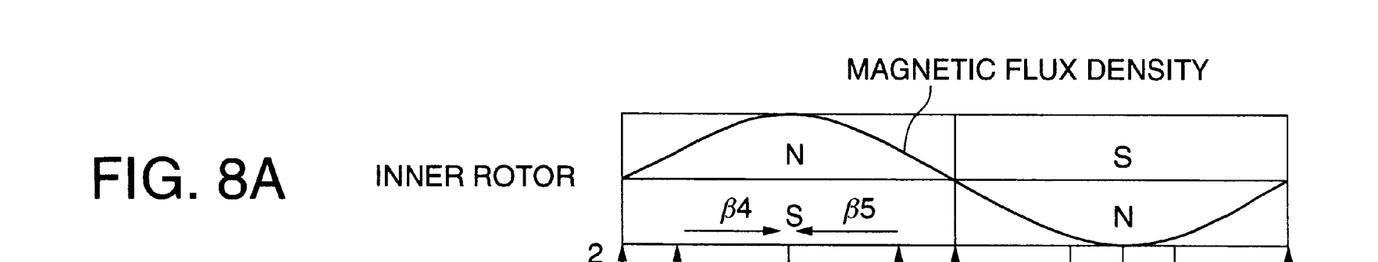
FIGS. 8A–8C are diagrams describing the relation between the correction of the composite current and the magnetic flux in the motor/generator.
Figure 8B:
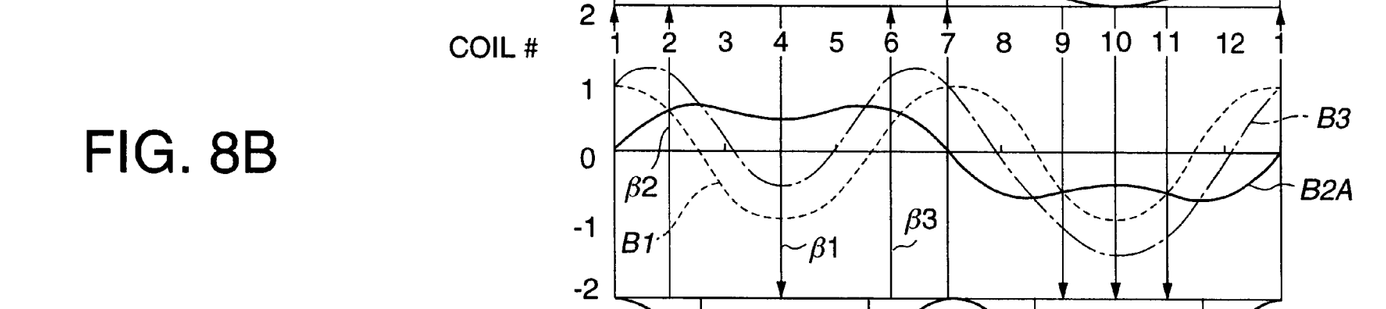
Figure 8C:
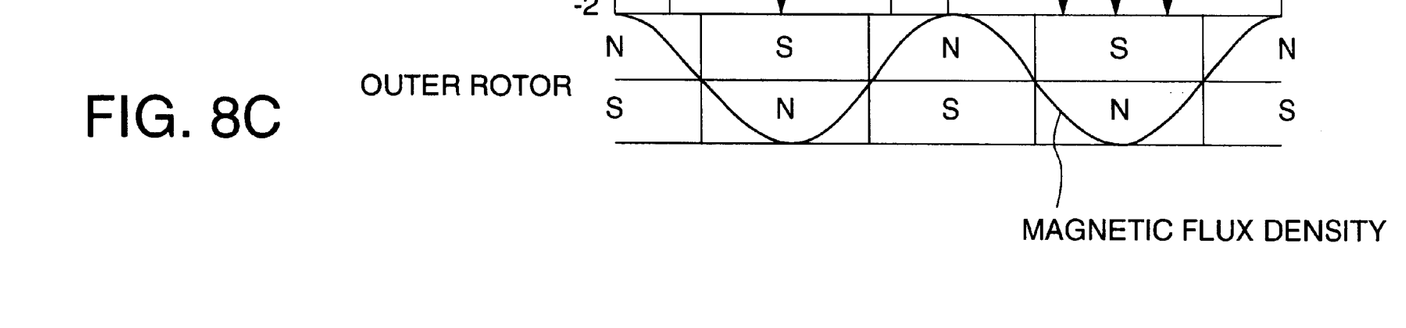

The flow of the magnetic flux will be described referring to FIGS. 8A–8C.

A magnetic flux β1 through the coil #4 from the inner coil 4 to the outer coil 3 is comprised of a magnetic flux β4 and a magnetic flux β5.

The magnetic flux β4 is formed on the outer surface of the inner rotor 4 by a part of the magnetic flux β2 flowing through the coil #2. The magnetic flux β5 is formed on the outer surface of the inner rotor 4 by a part of the magnetic flux β3 flowing through the coil #6. The magnetic flux β4 and β5 join at a point facing the coil #4 and then form the magnetic flux β1. The magnetic flux β1 is generated due to enhancement of the magnetic flux β2 and β3 of coils #2 and #6 by to the third harmonic component B23.

In FIG. 5, a deterioration region Z does not exist at a region with a temperature lower than the magnet temperature T2. Thus a composite current flowing into the coils #1–#12 need not be corrected in temperature regions lower than T2.

When the magnet temperature is higher than T2, if demagnetization occurs due to small magnetic flux density B, the operating condition falls into the deterioration region Z.

In the temperature region above the temperature T2, therefore, high harmonic components are added to the composite current so as to prevent the magnet of the outer rotor 3 from deteriorating in its magnetic properties.

The temperature characteristics of the magnet vary greatly depending on the material of the magnet, so the temperature T2 is determined experimentally.

The control device controls the power current of the coils #1–#12 in response to the temperature of the magnet based on the above criteria.

In this embodiment, the temperature Tc of the coils 6 are detected by the temperature sensor 16 as an approximate value of the temperature of the magnet of the outer rotor 3.

Figure 9:
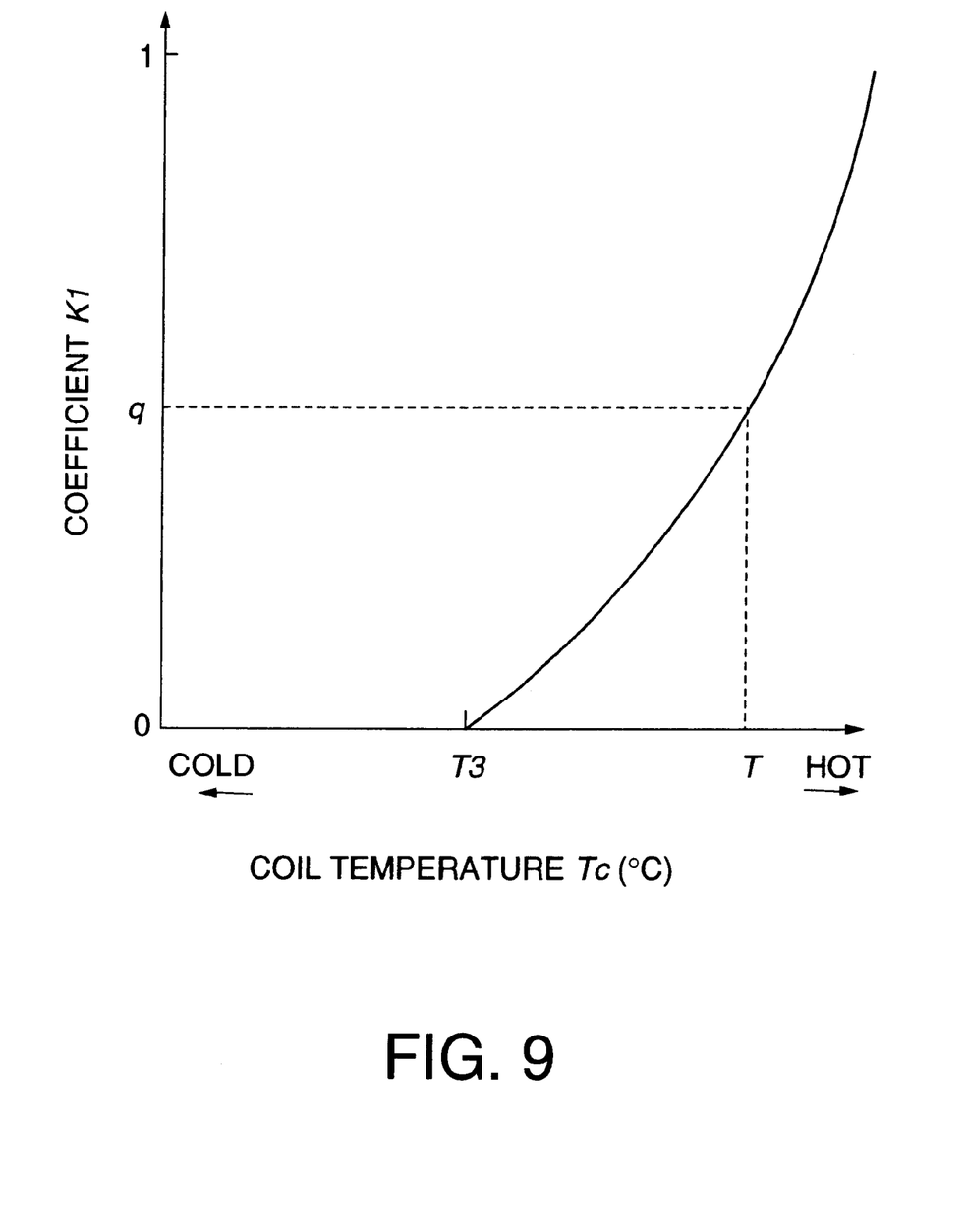
FIG. 9 is a diagram describing the contents of a map for a coefficient K1 stored in the control device.

A map of the coefficient K1 as shown in FIG. 9 is pre-stored in the control unit 15. When the coil temperature Tc is above a temperature T3 (T3>T2), the control unit 15 searches the map in FIG. 9 for a value θ between zero and one corresponding to the temperature Tc and sets this value of θ as the coefficient K1. The control unit 15 calculates the corrected magnetic flux density B2A using Equation (4) and the coefficient K1. Then the control unit 15 calculates the composite magnetic flux density B3 from Equation (6).

$$B3=B1+B2A \tag{6}$$

When the coil temperature Tc is lower than temperature T2, the composite magnetic flux density B3 is calculated from Equation (7).

$$B3=B1+B2 \tag{7}$$

The temperature region between temperatures T2 and T3 is considered to be a hysteresis region. Equation (6) is used with falling coil temperatures Tc and Equation (7) is used with rising coil temperatures Tc. It is also possible to switch between Equations (6) and (7) at a temperature T2 which is the initial temperature of the deterioration region Z without setting a hysteresis region.

The angular velocity $\omega_1$ of the outer rotor 3 required to calculate Equation (1) and the angular velocity $\omega_2$ of the inner rotor 4 required to calculate Equation (2) are calculated from each torque command value of the inner rotor 4 and the outer rotor 3 input into the control unit 15.

After executing the above process, the control unit 15 outputs a PWM signal to the inverter 12 so that an AC current corresponding to the calculated composite magnetic flux density B3 is supplied to the stator coil 6.

When a composite current corresponding to Equation (7) flows in the stator coils 6 of the motor/generator 1, the composite magnetic flux density B3 is increased at coil #10 where peaks of the magnetic flux densities B1 and B2 superimpose in the same direction. When Equation (6) is applied, that is to say the corrected magnetic flux density B2A is applied, the peak values are limited as shown in FIG. 7B. The correction of the magnetic flux density B2 has the desirable effect of preventing magnetic saturation or suppressing increases in the size of the device in order to avoid magnetic saturation.

Figure 10A:
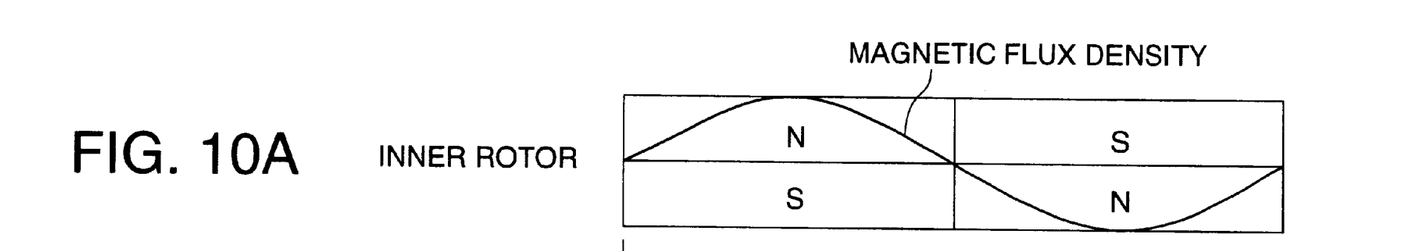
FIGS. 10A–10C are diagrams describing the distribution of magnetic flux in the motor/generator when the correction of the composite current is performed by the control device according to a second embodiment of this invention.

A second embodiment of this invention will be described referring to FIGS. 10A–10C.

In the first embodiment, the peak value of the magnetic flux density B2 driving the inner rotor 4, which has the fewer magnetic poles, is suppressed at the point of the coil #4 where the same poles of the outer rotor 3 and the inner rotor 4 face each other.

In the second embodiment, the same effect as in the first embodiment is obtained by conversely increasing the peak value of the magnetic flux density B1 driving the outer rotor 3, which has the larger number of magnetic poles.

In order to realize this control, a corrected magnetic flux density B1A is calculated by adding a fifth harmonic component B15 expressed by Equation (8) to Equation (1) above.

$$B15=Bm2 \cdot \sin5 \cdot (2 \cdot \omega_1 \cdot t - 2 \cdot \theta) \tag{8}$$

$$B1A=Bm2 \cdot \sin(2 \cdot \omega_1 \cdot t - 2 \cdot \theta) + \tfrac{1}{5} \cdot Bm2 \cdot \sin5 \cdot (2 \cdot \omega_1 \cdot t - 2 \cdot \theta) \tag{9}$$

When the coil temperature Tc is above the temperature T3, the control unit 15 calculates a composite magnetic flux density B3 from Equation (10) using the corrected magnetic flux density B1A calculated from Equation (9).

$$B3=B1A+B2 \tag{10}$$

Figure 10B:
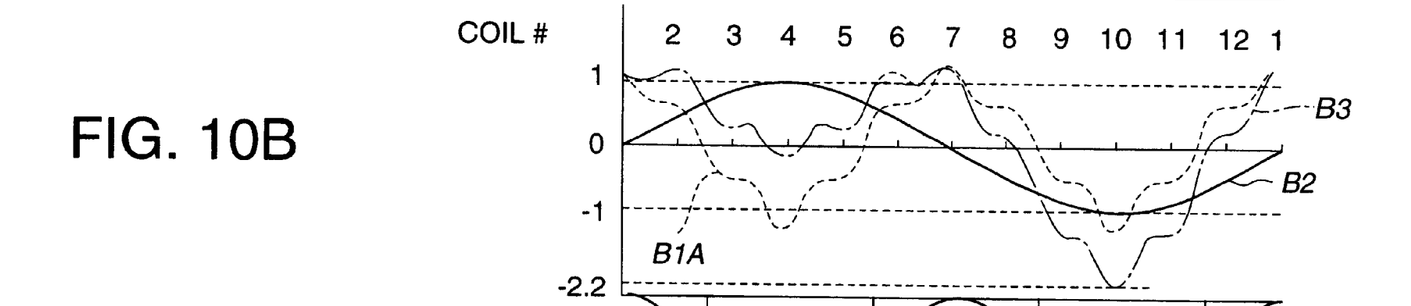
Figure 10C:
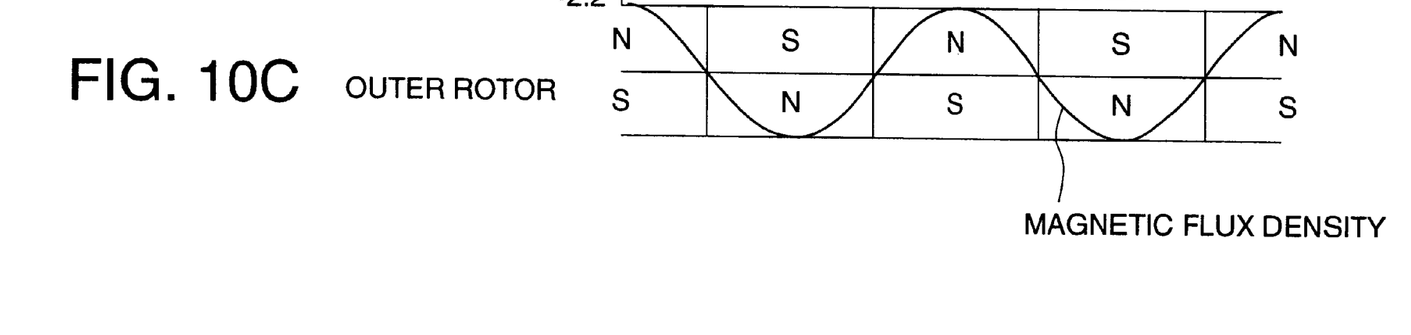

In this embodiment, as shown in FIG. 10B, the composite magnetic flux density B3 at the point of coil #4 shifts into the negative region by the application of the corrected magnetic flux density B1A. As a result, a flow of magnetic flux is created from the inner rotor 4 to the outer rotor 3 through the core of coil #4.

The above discussion has mentioned a method of reducing the peak by adding a third harmonic component to the magnetic flux density driving the rotor with fewer magnetic poles and a method of increasing the peak by adding a fifth harmonic component to the magnetic flux density driving the rotor with the greater number of magnetic poles. However this invention is not limited to the above embodiments and various harmonic components may be applied for the correction within the range described below.

Figure 11:
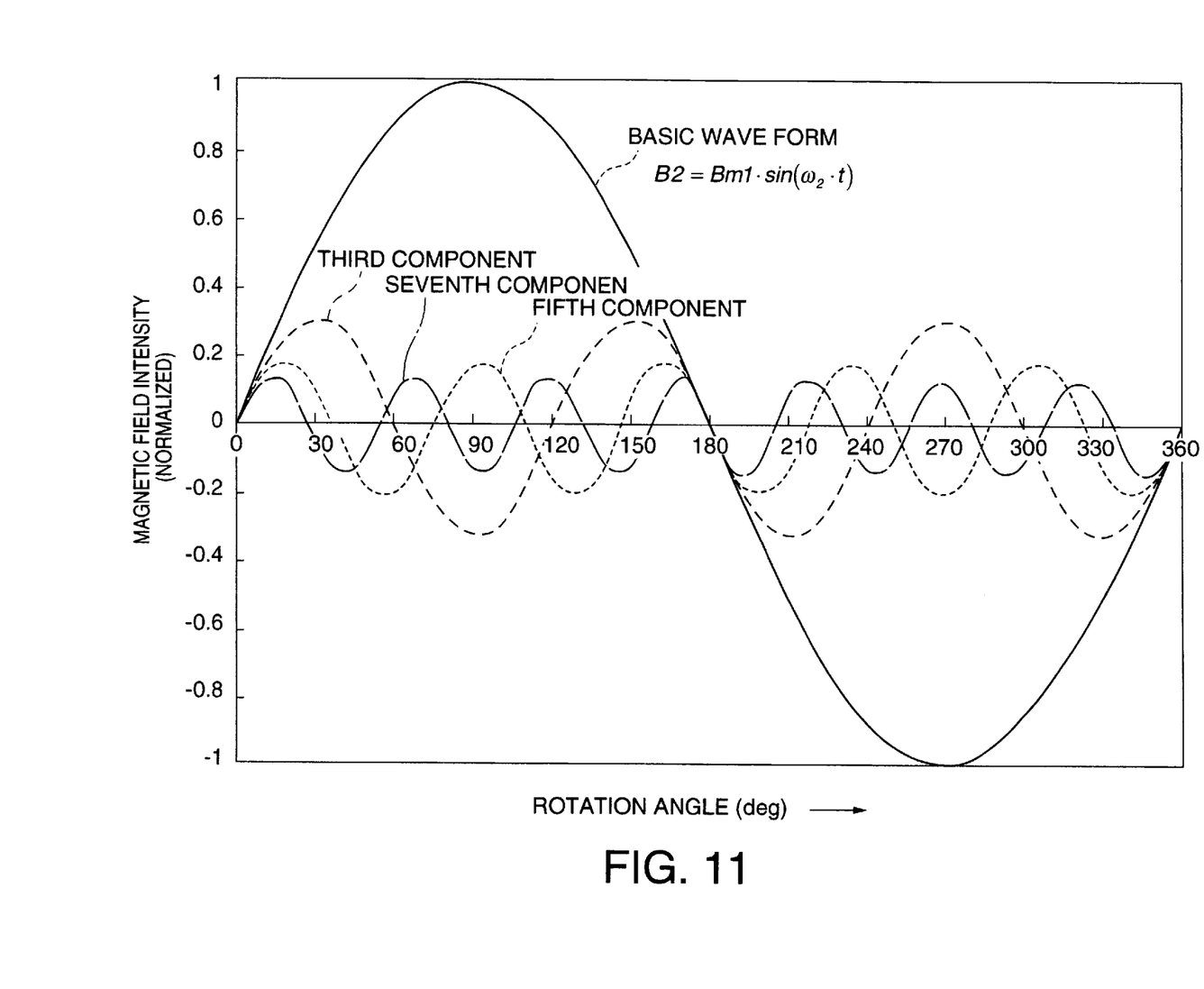
FIG. 11 is a diagram describing the wave form of magnetic flux driving an inner rotor of the motor/generator.

FIG. 11 shows the basic wave form of the magnetic flux density B2 of the inner rotor 4, which has the fewer magnetic poles, and the corresponding high harmonic components wave form. The high harmonic components which reduce the peak of the basic wave form is a wave form which has a negative peak at angles at which the basic wave form has a positive peak and has a positive peak at angles at which the basic wave form has a negative peak.

A (4n−1)th harmonic component where n is a natural number, such as the third harmonic component or the seventh harmonic component satisfies the above conditions. However in addition to apply only one of these (4n−1)th harmonic components, it is also possible to combine a (4n−1)th component with the other high order odd harmonic components such as the fifth or ninth harmonic component.

In this case, suitable coefficients are respectively multiplied by the other odd high harmonic components plus the third harmonic component, the basic wave form plus the seventh harmonic component, the basic wave form plus the third harmonic component plus the fifth harmonic component, the basic wave form plus the third harmonic component plus the fifth harmonic component plus the seventh harmonic component or the like.

On the other hand, it is not possible to apply composite components not containing the (4n−1)th harmonic components such as the basic wave form plus the fifth harmonic component, the basic wave form plus the ninth harmonic component, the basic wave form plus the fifth harmonic component plus the ninth harmonic component, for the correction of the magnetic flux density B2.

The coefficients respectively multiplied by the harmonic components in the calculation of the corrected magnetic flux density B2A are the inverse of the order numbers of the harmonic components as shown in Equation (11) below.

$$B2A=Bm1 \cdot \sin(\omega_2 \cdot t) + \tfrac{1}{3} \cdot Bm1 \cdot \sin(3 \cdot \omega_2 \cdot t) + \tfrac{1}{5} \cdot Bm1 \cdot \sin(5 \cdot \omega_2 \cdot t) + \tfrac{1}{7} \cdot Bm1 \cdot \sin(7 \cdot \omega_2 \cdot t) + \ldots \tag{11}$$

According to Equation (11), the wave form after the correction comes to be a rectangular shape as the number of the applied harmonic components increases.

On the other hand, when the correction due to the high harmonic components is applied to the magnetic flux density B1 of the outer rotor 3, which comprises the larger number of poles, a (4n+1)th harmonic component such as the fifth harmonic component or the ninth harmonic component which increase the peak of the basic wave form should be added.

Furthermore, as in the case of the correction of the magnetic flux density B2, it is also possible to perform a correction by applying a plurality of high harmonic components wherein a (4n+1)th harmonic component is predominant.

Motor/generators to which this invention is applied are motor/generators in which the magnets of two rotors are magnetically opposed through a stator. In the first and second embodiments, the stator and the two rotors are superimposed in a radial direction.

Figure 12A:
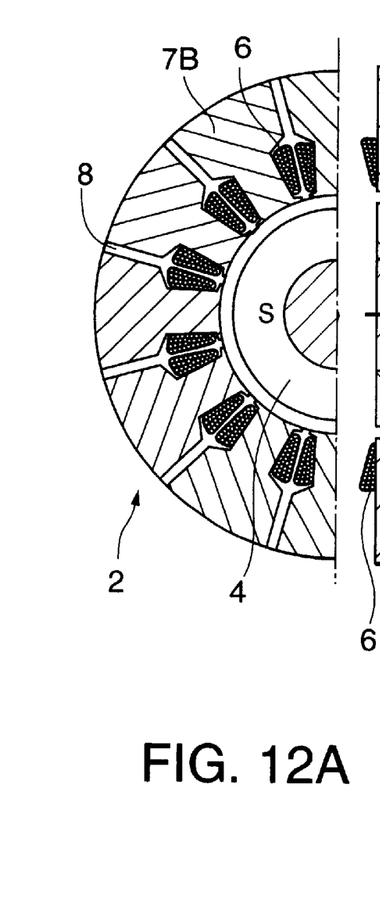
FIGS. 12A–12C are a schematic lateral and schematic longitudinal cross-sectional views of another type of motor/generator to which this invention can be applied.
Figure 12B:
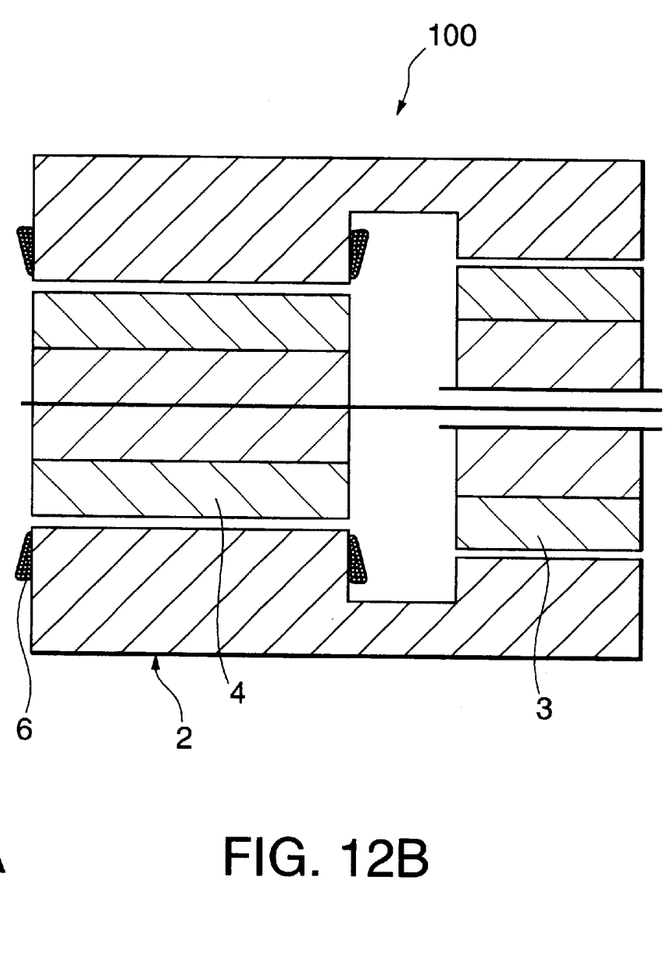
Figure 12C:
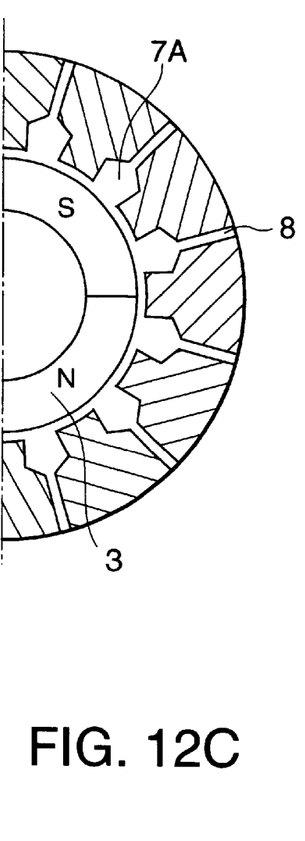

However, this invention may also be applied to a motor/generator 100 as shown in FIGS. 12A–12B. This motor/generator 100 is provided with two rotors 3 and 4 which are disposed coaxially in series on an inner side of the stator 2.

The rotor 3 is provided with four magnetic poles and the rotor 4 is provided with two magnetic poles. The stator 2 is provided with cores 7A facing the rotor 3 and the same number of cores 7B facing the rotor 4. The cores 7A, 7B are magnetically connected and the coils 6 are only wound onto the cores 7B.

The motor/generator 100 opposes the magnet of the rotor 3 and the magnet of the rotor 4 magnetically through the stator 2. Thus it is possible to prevent deterioration of the magnet of the rotor 3 due to demagnetization effect, by applying a current control to the coils 6 by this invention.

Although the above embodiments have been described for the case where the motor/generator 1 works as a motor, this invention is applicable when it works as a generator. When the motor/generator 1 works as a generator, the rotors 3, 4 are mechanically driven such that the stator coils 6 generate power current. The alternating current generated by the stator coils is converted to direct current by the inverter 12 which now works as a AC/DC converter. The control unit 15 controls the inverter 12 such that the alternating current will have a wave form which would not cause demagnetization of the magnet of the outer rotor 3.

The contents of Tokugan Hei 11-273367, with a filing date of Sep. 27, 1999 in Japan, and Tokugan 2000-273212 with a filing date of Sep. 8, 2000 are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A current control device for a motor/generator, the motor/generator having a stator provided with a plurality of coils, a first rotor provided with a fixed number of magnetic poles facing the stator, and a second rotor provided with fewer magnetic poles than the first rotor, the magnetic poles of the second rotor also facing the stator, the control device comprising:
    an inverter which regulates a wave form of an AC power current flowing through the coils in response to a signal; and
    a microprocessor programmed to:
        calculate a wave form of a first current flowing through the coils which generates a rotating magnetic field which is synchronous with a magnetic field produced by the first rotor;
        calculate a wave form of a second current flowing through the coils which generates a rotating magnetic field which is synchronous with a magnetic field produced by the second rotor;
        calculate a wave form of a correcting current which, at a position where a specific magnetic pole in the first rotor and a pole of the second rotor with the same polarity face each other, increases a density of a magnetic flux passing through the specific magnetic pole; and
        generate the signal which realizes a composite wave form comprising a wave form of the first current, a wave form of the second current and a wave form of the correcting current.

2. A current control device as defined in claim 1, wherein the wave form of the correcting current comprises a wave form of a harmonic component of the second current which reduces a peak value of the second current.

3. A current control device as defined in claim 2, wherein the harmonic component has an order defined by (4n−1), where n is a natural number.

4. A current control device as defined in claim 2, wherein the wave form of the correcting current comprises a harmonic component having an order defined by (4n−1) of the second current and multiplied by a coefficient equal to 1/(4n−1) where n is a natural number.

5. A current control device as defined in claim 4, wherein the wave form of the correcting current comprises another harmonic component having an order defined by (4n−1) of the second current and multiplied by another coefficient equal to 1/(4n−1).

6. A current control device as defined in claim 1, wherein the wave form of the correcting current comprises a wave form of a harmonic component of the first current which increases a peak value of the first current.

7. A current control device as defined in claim 6, wherein the harmonic component has an order defined by (4n+1), where n is a natural number.

8. A current control device as defined in claim 6, wherein the wave form of the correcting current comprises a harmonic component having an order defined by (4n+1) of the first current and multiplied by a coefficient equal to 1/(4n+1), where n is a natural number.

9. A current control device as defined in claim 8, wherein the wave form of the correcting current comprises another harmonic component having an order defined by (4n+1) of the first current and multiplied by another coefficient equal to 1/(4n+1).

10. A current control device as defined in claim 1, wherein the control device further comprises a sensor which detects a temperature of the first rotor; and the microprocessor is further programmed to set the correcting current to zero, when the temperature of the first rotor is lower than a predetermined temperature.

11. A current control device as defined in claim 10, wherein the microprocessor is further programmed to increase the proportion of the wave form of the correcting current in the wave form of the composite current as the temperature of the first rotor rises in a region which higher than the fixed temperature.

12. A current control device as defined in claim 10, wherein the sensor comprises a sensor which detects a temperature of the stator.

13. A current control device for a motor/generator, the motor/generator having a stator provided with a plurality of coils, a first rotor provided with a fixed number of magnetic poles facing the stator, and a second rotor provided with fewer magnetic poles than the first rotor, the magnetic poles of the second rotor also facing the stator, the control device comprising:
    means for regulating a wave form of an AC power current flowing through the coils in response to a signal;
    means for calculating a wave form of a first current flowing through the coils which generates a rotating magnetic field which is synchronous with a magnetic field produced by the first rotor;
    means for calculating a wave form of a second current flowing through the coils which generates a rotating magnetic field which is synchronous with a magnetic field produced by the second rotor;

means for calculating a wave form of a correcting current which, at a position where a specific magnetic pole in the first rotor and a pole of the second rotor with the same polarity face each other, increases a density of a magnetic flux passing through the specific magnetic pole; and means for generating the signal which realizes a composite wave form comprising a wave form of the first current, a wave form of the second current and a wave form of the correcting current.

14. A current control method for a motor/generator, the motor/generator having a stator provided with a plurality of coils, a first rotor provided with a fixed number of magnetic poles facing the stator, and a second rotor provided with fewer magnetic poles than the first rotor, the magnetic poles of the second rotor also facing the stator, the method comprising:

calculating a wave form of a first current flowing through the coils which generates a rotating magnetic field which is synchronous with a magnetic field produced by the first rotor;

calculating a wave form of a second current flowing through the coils which generates a rotating magnetic field which is synchronous with a magnetic field produced by the second rotor;

calculating a wave form of a correcting current which, at a position where a specific magnetic pole in the first rotor and a pole of the second rotor with the same polarity face each other, increases a density of a magnetic flux passing through the specific magnetic pole; and providing the coils with a power current of a composite wave form comprising a wave form of the first current, a wave form of the second current and a wave form of the correcting current.

* * * * *